United States Patent [19]

Wada

[11] Patent Number: 5,018,031

[45] Date of Patent: May 21, 1991

[54] MAGNETIC TAPE APPARATUS WITH LOADING MECHANISM

[75] Inventor: Satoshi Wada, Tokyo, Japan

[73] Assignee: NEC Corporation, Japan

[21] Appl. No.: 389,985

[22] Filed: Aug. 7, 1989

[30] Foreign Application Priority Data

Aug. 12, 1988 [JP] Japan .................................. 63-200065

[51] Int. Cl.⁵ ............................................. G11B 5/008
[52] U.S. Cl. ..................................... 360/96.5; 360/93
[58] Field of Search .................. 360/93, 96.5; 242/200

[56] References Cited

U.S. PATENT DOCUMENTS 4,530,252  7/1985  Sarges et al. ..................... 74/388 R
4,578,724  3/1986  Beitler ............................ 360/96.5 X Primary Examiner—Robert S. Tupper
Assistant Examiner—Andrew L. Sniezek
Attorney, Agent, or Firm—Leydig, Voit & Mayer

[57] ABSTRACT

A magnetic tape apparatus includes a cartridge holder which supports a cartridge magnetic tape. A press lever has a first end which is pivotally supported by a support shaft provided to the cartridge holder and a second end which extends to a position where the press lever presses against the cartridge magnetic tape. A push rod pivotally supported by the press lever is arranged to be adjacent to the press lever. A set spring is arranged at one end of the push rod, for normally biasing the press lever in a first direction about the support shaft. A biasing mechanism is arranged at the other end of the push rod for biasing the press lever in the opposite direction, thereby pressing the cartridge magnetic tape against a magnet clutch.

5 Claims, 4 Drawing Sheets

MAGNETIC TAPE APPARATUS WITH LOADING MECHANISM

BACKGROUND OF THE INVENTION

The present invention relates to a magnetic tape apparatus and, more particularly, to a loading mechanism for a cartridge magnetic tape used for, e.g., an information processing apparatus.

FIG. 1 is a longitudinal sectional view showing a magnetic apparatus using a cartridge magnetic tape (to be referred to as a cartridge hereinafter).

In FIG. 1, the conventional apparatus includes a cartridge 11, a cartridge holder 12, a crank arm 21, a load motor 22, a driver 23, a magnet clutch 25, a guide shaft 50, a compression coil spring 51, and a cartridge press 52.

In the magnetic tape apparatus with the above arrangement, when the cartridge 11 is loaded, the load motor 22 is rotated to urge the cartridge press 52 against the cartridge 11 through the crank arm 21. The cartridge 11 is set on the magnet clutch 25, and data write or read access to or from the cartridge 11 is enabled. In this case, the guide shaft 50 guides the compression coil spring 51 and the cartridge press 52.

The conventional magnetic tape apparatus is of a so-called direct moving type in which the guide shaft 50 is slid vertically to press the cartridge 11. For this reason, as shown in FIG. 2, while the crank shaft 21 is moved according to the rotation of the load motor 22, the guide shaft 50 is inclined, and sliding of the guide shaft 50 tends to twist.

In order to eliminate such a drawback, the load motor 22 of the conventional magnetic tape apparatus must have a torque larger than necessary.

Furthermore, since the compression coil spring 51 for the cartridge press is arranged immediately above the cartridge press, the height of the magnetic tape apparatus is increased.

SUMMARY OF THE INVENTION

It is therefore a principal object of the present invention to provide a magnetic tape apparatus which can prevent a guide shaft from twisting and can reduce the height of the magnetic tape apparatus.

Accordingly, the present invention provides magnetic tape apparatus comprising a cartridge holder and first and second swinging members. The cartridge holder and first and second swinging members. The cartridge holder supports a magnetic tape cartridge. The first swinging member has one end which is pivotally supported by a first support shaft mounted to the cartridge holder and another end which extends to a first position where the first swinging member presses against the magnetic tape cartridge. The second swinging member is pivotally mounted to the first swinging member by a second support shaft located between the ends of the first swinging member. The magnetic tape apparatus further comprises first and second biasing mechanisms. The first biasing mechanism is arranged at a first end of the second swinging member and has a biasing force which normally biases the first swinging member in a first direction about the first support shaft away from the magnetic tape cartridge. The second biasing mechanism is arranged at a second end of the second swinging member and has a biasing force greater than the biasing force of the first biasing mechanism. The second biasing mechanism biases the second end of the second swinging member, forcing the first swinging member to move in a second direction about the first support shaft and extending the first swinging member to the first position. This presses the magnetic tape cartridge against a magnet clutch.

DESCRIPTION OF THE PREFERRED EMBODIMENT

Figure 3:
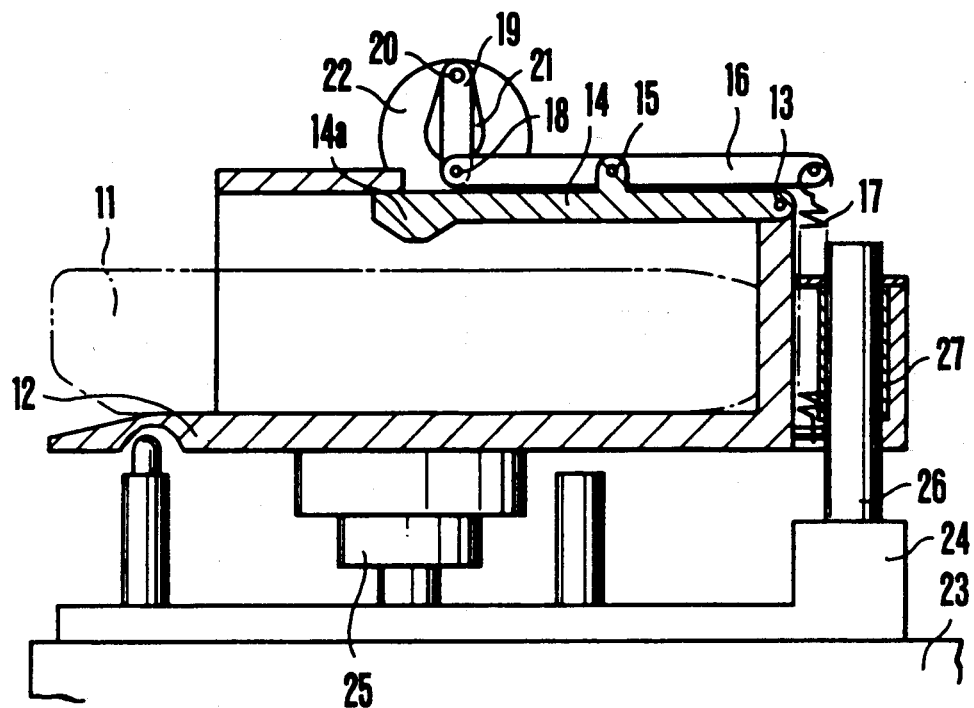
FIG. 3 is a longitudinal sectional view of an embodiment of a magnetic tape apparatus according to the present invention when it receives a cartridge.
Figure 4:
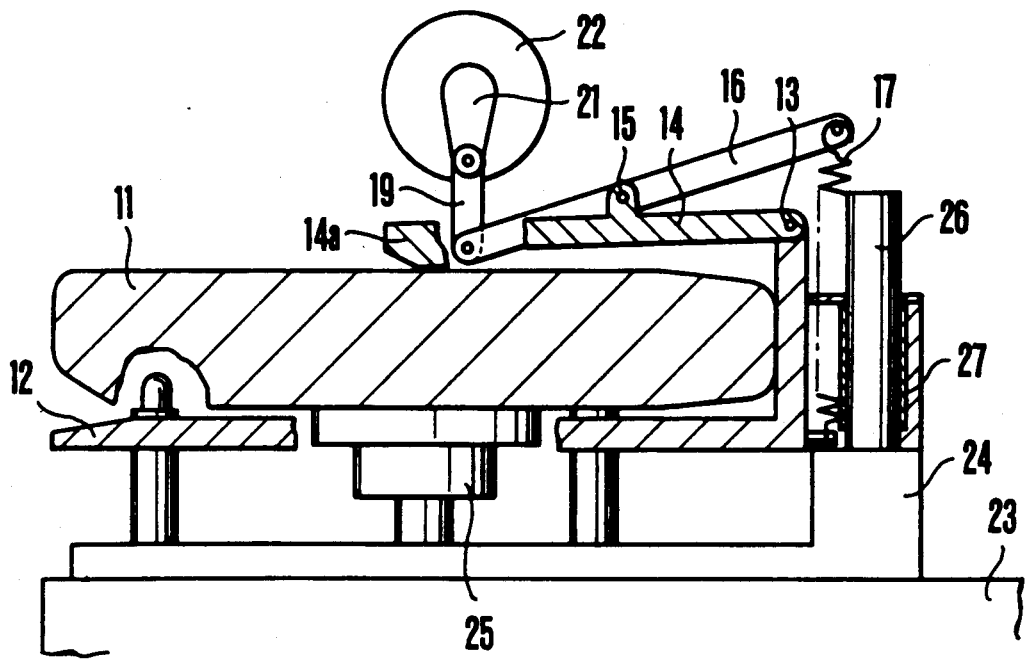
FIG. 4 is a longitudinal sectional view of the magnetic tape apparatus according to the present invention when the cartridge is set.

FIG. 3 is a longitudinal sectional view showing a state wherein a magnetic tape apparatus of the present invention receives a cartridge, and FIG. 4 is a longitudinal sectional view showing a state wherein the cartridge is set in the magnetic tape apparatus of the present invention.

Figure 1:
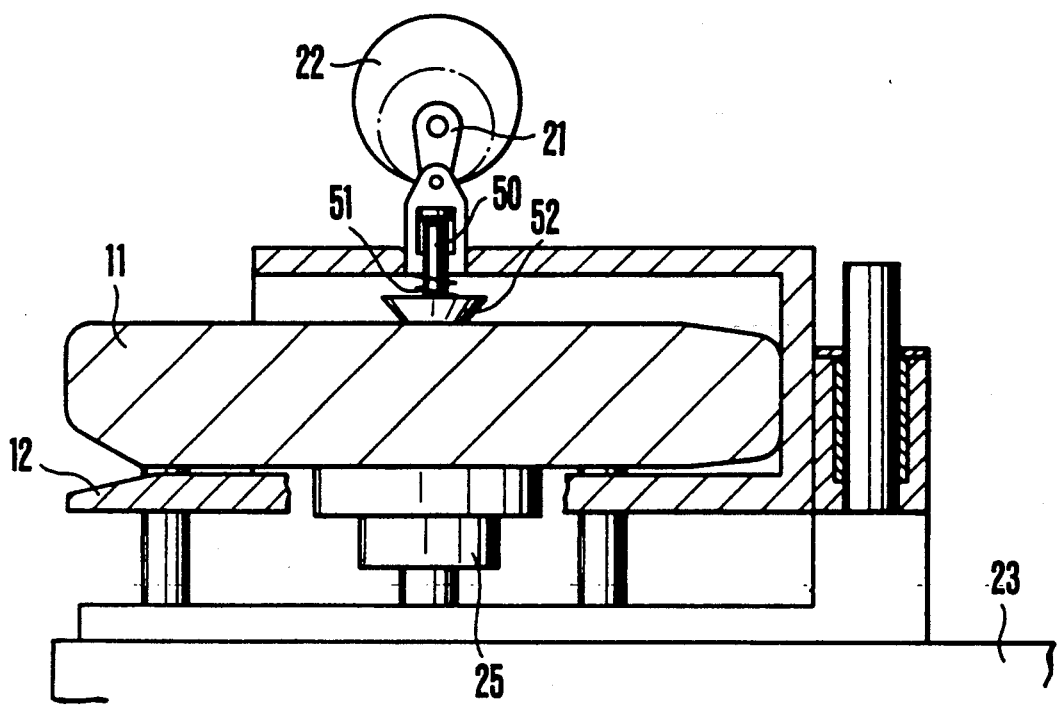
FIG. 1 is a longitudinal sectional view showing a conventional magnetic tape apparatus.
Figure 2:
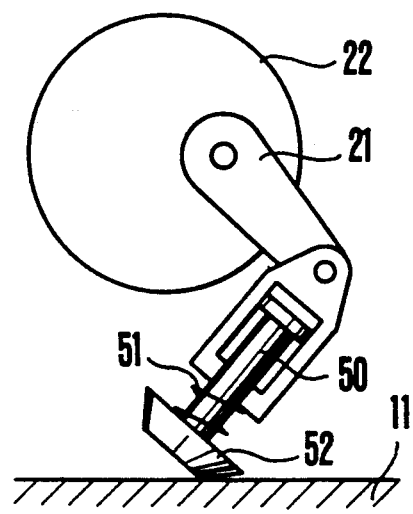
FIG. 2 is a view showing a twisting state of a conventional cartridge press.

The same reference numerals in FIGS. 3 and 4 denote the same parts as in FIG. 1. The magnetic tape apparatus includes a press lever pin (support shaft) 13, a press lever (first swinging member) 14, a cartridge press 14a, a push rod pin 15, a push rod (second swinging member) 16, a set spring (first biasing means) 17, a connection pin 18, a connection rod 19, a crank pin 20, a base plate 24, a guide shaft 26, and a guide bushing 27. Note that components 19, 20, and 21 constitute a second biasing means.

A cartridge holder 12 is moved along the guide shaft 26 on the base plate 24 which is arranged on a driver 23 through the guide bushing 27 arranged integrally with the cartridge holder 12. A crank arm 21 and the connection rod 19 are rotatably arranged on a load motor 22. The connection rod 19 is rotatably coupled to one end of the push rod 16. The central portion of the push rod 16 is swingably supported on the press lever 14 by the push rod pin 15 The set spring 17 is attached to an end of the push rod 16 opposite to the end to which the connection rod 19 is coupled. The other end of the spring 17 is fixed to the cartridge holder 12. The cartridge press 14a is formed at the distal end of the press lever 14, and the other end of the press lever 14 is pivotally supported on one end of the cartridge holder 12.

The operation of the magnetic tape apparatus with the above arrangement will be described below. When a cartridge 11 is loaded in the cartridge holder 12 and the load motor 22 is rotated, the push rod 16 swings through the push rod pin 15 in a direction to press the cartridge press 14a against the cartridge 11. Thus, the cartridge 11 is set on the magnet clutch 25, and data write or read access to or from the cartridge 11 is enabled.

Note that when the cartridge 11 need not be pressed, the cartridge press 14a is returned by the set spring 17 and the push rod 16 to a position where it does not disturb entrance of the cartridge 11.

A detailed arrangement of the magnetic tape apparatus will be described below.

Figure 5:
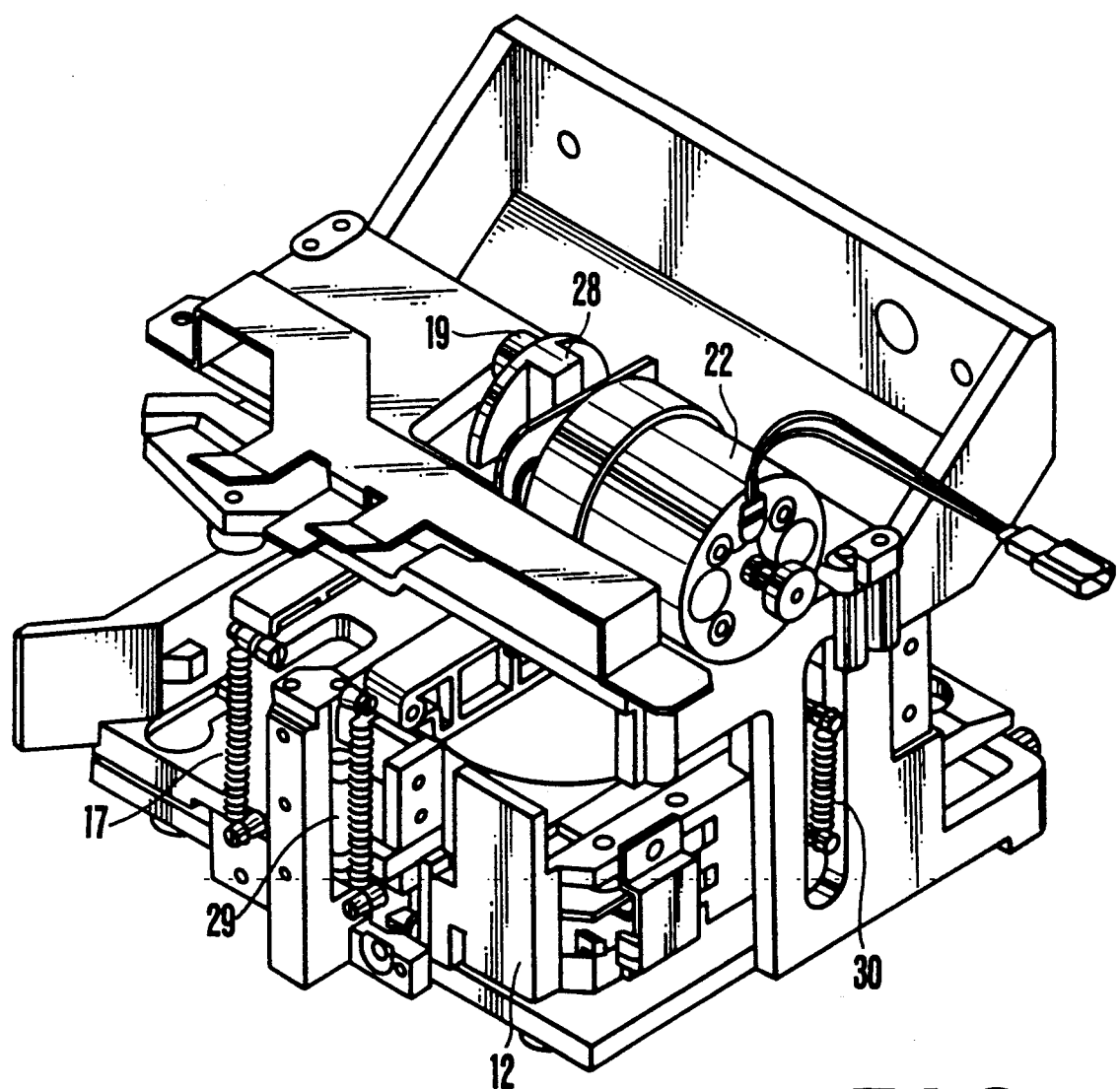
FIG. 5 is a perspective view showing a detailed loading mechanism of the magnetic tape apparatus according to the present invention.

FIG. 5 is a perspective view showing a detailed loading mechanism of the magnetic tape apparatus according to the present invention.

The same reference numerals in FIG. 5 denote the same or equivalent parts as in FIG. 3. Reference numeral 28 denotes a drive plate; 29, a linear guide; and 30, a hold spring. The linear guide 29 corresponds to the guide shaft 26 and the guide bushing 27 shown in FIG. 3.

Figure 6:
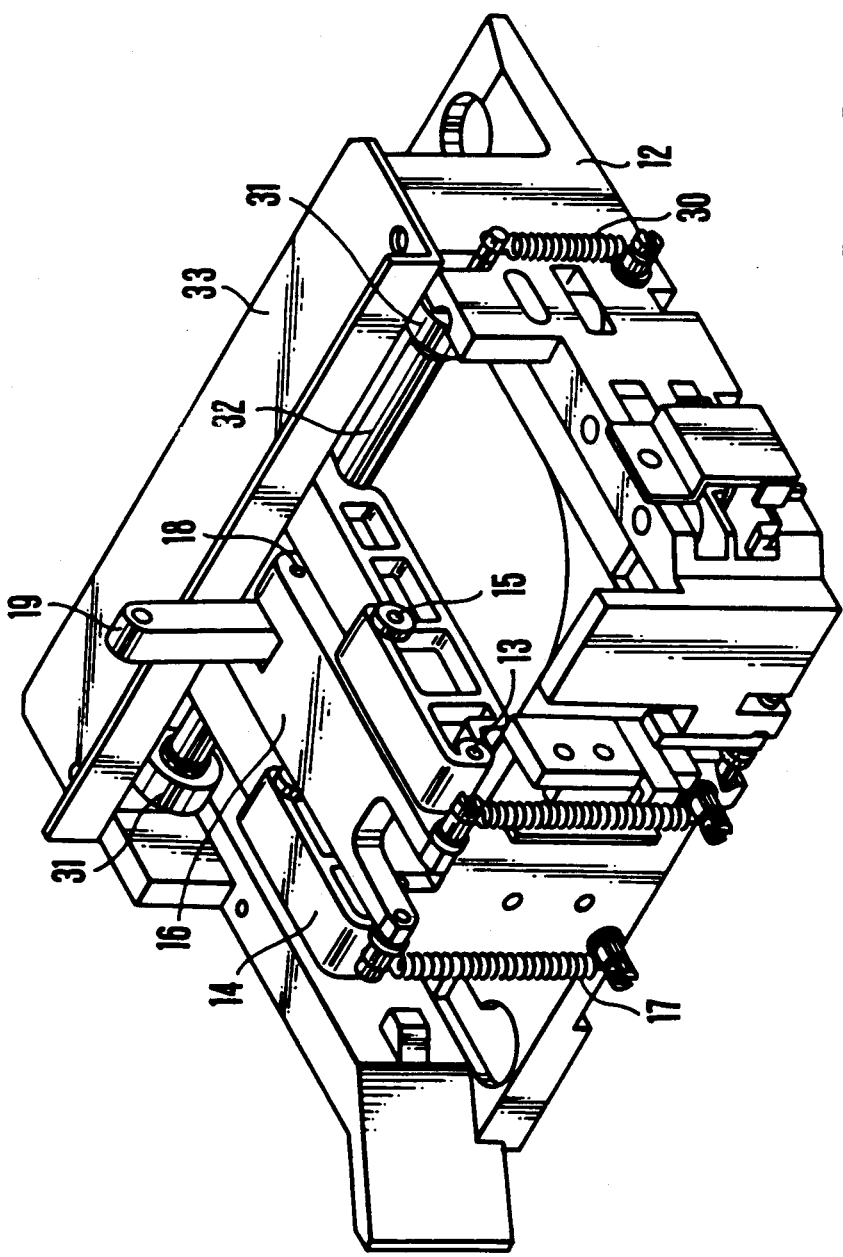
FIG. 6 is a perspective view showing a portion around a cartridge holder of the magnetic tape apparatus according to the present invention.

FIG. 6 is a perspective view showing a portion around the cartridge holder in the loading apparatus according to the present invention. The same reference numerals in FIG. 6 denote the same or equivalent parts as in FIG. 3. Reference numeral 31 denotes a press roller; 32, a press roller shaft; and 33, a cartridge lid. The cartridge holder 12 which moves integrally with the cartridge is guided along the linear guide 29. One end of the connection rod 19 is rotatably coupled to the drive plate 28, and the other end thereof is rotatably coupled to the push rod 16. The central portion of the push rod 16 is rotatably coupled to the press lever 14, and its end portion which is not coupled to the connection rod 19 is coupled to the set spring 17. The other end of the press lever 14 is rotatably coupled to the cartridge holder 12.

The load motor 22 shown in FIGS. 5 and 6 is arranged at a position opposite to that illustrated in FIGS. 3 and 4. The crank arm 21 shown in FIG. 3 need only constitute a crank mechanism together with the connection rod 19, and may comprise a disk-like drive plate, as shown in FIG. 5. The press roller 31 coupled to the press roller shaft 32 corresponds to the cartridge press 14a shown in FIG. 3.

With this arrangement, when the load motor 22 is started, the drive plate 28 is rotated to move the connection rod 19, and the cartridge is pressed by the press roller 31 coupled to the press roller shaft 32 through the push rod 16 and the press lever 14.

As described above, according to the present invention, since the rotation of the load motor is transmitted to the cartridge press through the push rod, twisting will not occur unlike in the conventional apparatus. Therefore, an excessive load will not be applied to the load motor.

Since the set spring can be arranged at a position separated from the cartridge press, the height of the magnetic tape apparatus can be decreased.

What is claimed is:

1. A magnetic tape apparatus comprising:
a cartridge holder which supports a magnetic tape cartridge;
a first swinging member having one end which is pivotally supported by a first support shaft mounted to said cartridge holder and another end which extends to a first position where said first swinging member presses against said magnetic tape cartridge;
a second swinging member pivotally mounted to said first swinging member by a second support shaft located between the ends of the first swinging member;
first biasing means arranged at a first end of said second swinging member, and having a biasing force which normally biases said first swinging member in a first direction about said first support shaft away from said magnetic tape cartridge; and
second biasing means arranged at a second end of said second swinging member and having a biasing force greater than the biasing force of said first biasing means, said second biasing means biasing the second end of said second swinging member, forcing said first swinging member to move in a second direction about said first support shaft and extending said first swinging member to said first position, thereby pressing said magnetic tape cartridge against a magnet clutch.

2. An apparatus according to claim 1, wherein said first biasing means comprising a spring one end of which is coupled to said second swinging member and the other end of which is coupled to said cartridge holder.

3. An apparatus according to claim 1, wherein said second biasing means comprises a motor and a crank mechanism.

4. An apparatus according to claim 1, wherein said first support shaft is arranged at a side facing a rear surface of said cartridge holder.

5. An apparatus according to claim 1, further comprising a base which includes a guide member, said cartridge holder being arranged to move along said guide member integrally with the cartridge magnetic tape cartridge.

* * * * *